United States Patent [19]

Kelly et al.

[11] 4,139,671

[45] Feb. 13, 1979

[54] BOWLING LANE SURFACE

[75] Inventors: Peter B. Kelly, Coshocton; Donald G. Pucci, West Lafayette, both of Ohio

[73] Assignee: General Electric Company, Schenectady, N.Y.

[21] Appl. No.: 833,785

[22] Filed: Sep. 16, 1977

[51] Int. Cl.$^2$ .................. A63D 1/04; B32B 29/06; B32B 3/10

[52] U.S. Cl. .................... 428/211; 273/51; 428/203; 428/204; 428/447; 428/503; 428/506; 428/509; 428/513; 428/530; 428/537

[58] Field of Search .................. 273/51, DIG. 29; 428/447, 211, 203, 204, 509, 513, 503, 506, 527, 530, 537

[56] References Cited

U.S. PATENT DOCUMENTS

| | | | |
|---|---|---|---|
| 2,531,168 | 11/1950 | Snyder | 273/51 |
| 3,135,643 | 6/1964 | Michl | 428/530 |
| 3,402,070 | 9/1968 | Brodmann | 428/447 |
| 3,433,667 | 3/1969 | Gergle | 428/447 |
| 3,549,475 | 12/1970 | Hefley | 428/447 |
| 3,670,049 | 6/1972 | Stein | 273/51 |
| 3,962,519 | 6/1976 | Rüsh | 428/447 |
| 3,965,518 | 6/1976 | Muoio | 428/447 |
| 4,000,339 | 12/1976 | Murphy | 428/447 |
| 4,036,496 | 7/1977 | Robinson | 428/447 |

OTHER PUBLICATIONS

"First All Synthetic Lane Surface Approved by ABC", *Bowling*, Jan. 1977, p. 6.
"Newest Bowling Lane Surface", *Bowling*, Jun. 1977, pp. 2 & 3.

*Primary Examiner*—Ellis P. Robinson
*Attorney, Agent, or Firm*—Morgan, Finnegan, Pine, Foley & Lee

[57] ABSTRACT

In a bowling lane having a decorative laminate surface, an internal lubricant in the resin for the laminate surface obviates the need for oil treatment or conditioning of the surface.

19 Claims, No Drawings

BOWLING LANE SURFACE

This invention relates to new and improved bowling lane structures or surfaces. More particularly, it relates to decorative laminate bowling surfaces which are characterized by salutary physical properties, an internal lubricant or slip agent in the resin for the laminate surface obviating the need for oil treatment or conditioning of the surface.

Present-day standard bowling lanes are generally constructed of suitably finished hardwood blocks or planking. For a lane bed about 41 to 42 inches wide, the wood construction typically consists of from about 39 to 42 maple planks or boards about one inch thick laid edgewise, or on edge, in line with the longitudinal axis of the lane. The surface of the lane is made plane or flat and coated with varnish or lacquer which is then usually treated as with mineral oil to reduce wear and adjust the coefficient of friction or slippage of the surface in order to produce uniform action and control of the bowling ball. The surface finish of such wooden lanes typically consists of a nitrocellulose or polyurethane base lacquer which can be treated with plasticizers or other additives to provide with the oil treatment the desired wear and slippage or friction characteristics.

It is usual commercial practice to oil the surface of such bowling lanes daily with mineral oil or an equivalent. The disadvantages of such treatment will be immediately apparent. The practice is costly and time consuming and results in accelerated deterioration of the lane surface by reason of the oil seeping into boards, cracks and other areas. Additionally, even with the daily oiling, uniformity of lane surface reaction to the thrown ball is not constant because the oil which is often applied on up to about the first half of a normal lane which is about sixty-three feet long is carried by the ball down lane toward the pins, depriving the critical lane area of surface of oil which is necessary for meticulous ball control. Additionally, the oil collects dust and dirt, thus further leading to lane deterioration and the necessity for frequent cleaning which in itself results in further deterioration of the lane surface. In some cases where the oil is not applied properly, the resultant so-called blocking or doctoring of the oil in a non-uniform manner can result in effect in oil layers which direct or control the ball in a manner which is not consistent with good bowling practice, sometimes resulting not only in unwarranted high scores but in some cases in abnormally low scores.

It has been suggested that decorative plastic laminates having a thermosetting resin impregnated fibrous core overlaid with a decorative layer and a thermosetting resin impregnated paper fibrous overlay or thermosetting resin overlay coating be used in place of the usual wood surface. Certain of such decorative laminate lane surfaces are characterized by salutary impact resistance which, measured by NEMA Standard 81964, has a falling ball impact resistance of over 60 inches as compared to 32 inches for a typical varnished or lacquered hardwood or maple lane. Further, when a 16 pound standard bowling ball is dropped on such improved surface from a height of three feet, there is no visible effect as opposed to denting and tearing of a wooden surface. The abrasion resistance of such decorative laminates either by reason of abrasive materials in the overlay layer or the resin composition surface can have an abrasion resistance as measured by the Taber abraser, according to NEMA Standard 8-20-1962, of from about 500 cycles to 2500 cycles depending on the particular surface. This compares with polyurethane varnish and nitrocellulose lacquer finished wooden lanes which have a Taber abrasion resistance of 40 cycles and 25 cycles respectively. In order to adjust the slip or coefficient of friction of such decorative laminate surfaced bowling lanes, mineral oil treatment is used as with wooden surfaced lanes, the coefficient of friction with such mineral oil treatment being 0.18 as compared to 0.18 for typical polyurethane varnished wooden layers and 0.16 for typical nitrocellulose lacquer coated wooden lanes.

It will be readily appreciated that it would be desirable even with decorative plastic laminate surfaced lanes to eliminate the dressing of such lanes from the standpoint of time and labor alone even though such lanes might be more resistant otherwise to the oil than wooden lanes. It is, accordingly, a primary object of the present invention to provide bowling lane decorative laminate surfaces which contain an internal lubricant or slip agent or material in the resin impregnant for the laminate surface which obviates the need for separate surface treatment or oiling of the surface.

The bowling lane surfaces or laminates of the present invention are readily made. The core sheets are typically of kraft paper which can be impregnated with any of the thermosetting resins conventionally used in the production of decorative laminates. The most common of these resins is a condensation product of a phenol and an aldehyde and generally an alkaline catalyzed phenol formaldehyde condensation product. A specific phenolic resin used in this connection is a light colored, thermosetting, general purpose phenol formaldehyde resin of the above description sold by the Monsanto Company under the name of Resinox 470. As in typical decorative laminates, the core sheets of kraft paper or creped kraft paper or selected combinations of such papers are overlaid with a so-called print sheet which imparts the decorative effect as of wood grain or any other finish to the laminate. Any of a number of thermosetting resins can be used for impregnating the print sheet including, preferably, a condensation product of melamine and an aldehyde, such materials being characterized by excellent wearing, translucency and resistance to discoloring. A specific material found useful in this connection is a modified melamine formaldehyde reaction product sold by American Cyanamid Company under the name of Cymel 428. This resin is a white, free-flowing powder specifically designed for the treatment of paper to be used in decorative laminates. The resin is readily soluble in water or in alcohol-water solvents and gives a clear, colorless solution which is stable at 50 percent by weight solids content for at least two days at room temperature. Typical properties of a 50 percent aqueous solution of this resin at 25° C. include a pH of 8.8 to 9.6, a Gardner viscosity of A to B, a solids content at maximum dilution in water of 26 percent and a solids content at maximum dilution in water of 26 percent. Other equivalent melamine base resins can be used. However, other resins such as ureas, aminotriazines, light-colored, highly purified phenolic resins, polyester resins including unsaturated alkydvinyl monomer types, acrylics, ethoxyline resins and the like can also be used. Among the melamine resins which can be used are the several more fully described in U.S. Pat. No. 2,605,205. In preparing the plastic laminate, the core kraft paper is impregnated in any desired manner with the thermosetting resin and dried, the resin content of the dried core paper sheet before consolidation ranging typically from about 25 to 29 percent by weight for ordinary kraft paper and from about 34 to 37 percent by weight of resin for the normally used crepe kraft paper.

The paper overlay or protective layer of the present invention is normally of a highly purified, transparent, alpha cellulose although it can also consist of other transparent or highly translucent cellulosic or synthetic resin fibers such as those of rayon or mixtures of such fibers such as those described in U.S. Pat. No. 2,816,851, among others. This material is usually impregnated with a melamine resin such as that above which contains the internal lubricant and usually dried to a resin content of from about 60 to 70 percent by weight before consolidation with the remainder of the laminate under heat and pressure.

The abrasion and wear resistance of the paper overlay can be increased by incorporating abrasive materials such as finely divided silica, silicon carbide, emery, diamond, tungsten carbide, titanium carbide, boron nitride, aluminum oxide and mixtures of such materials with each other and with other finely divided materials, the wear or abrasion resistance of the overlay being specifically tailored as desired by using materials of the desired hardness. These materials can be uniformly distributed throughout the overlay as by the teaching of U.S. Pat. No. 3,373,070, to give uniform abrasion resistance as the overlay is worn away or they can be concentrated in the surface of the overlay or graded through the thickness of the overlay as desired.

It will be realized that the process of making the present laminates can be varied and substitutions of materials made by those skilled in the art.

The following examples illustrate the practice of the present invention, it being realized that they are to be taken as exemplary only and not as limiting in any way.

EXAMPLE 1

There was prepared an overlay of alpha cellulose paper impregnated with a 50 percent by weight water solution of melamine formaldehyde resin, the resin being treated with an emulsion in water of silicone, specifically polydimethylsiloxane, said emulsion containing 35 percent by weight of such polydimethylsiloxane, the viscosity of the siloxane emulsion being 10,000 centipoises at 25° C. Various amounts of emulsion were used to provide in the final cured overlay impregnating resin 2 percent by weight, 4 percent by weight, 5 percent by weight, and 8 percent by weight of the siloxane solids based on the weight of the cured overlay resin impregnant. There were also prepared in a similar manner core layers of 130 pound basis weight kraft paper and 140 pound basis weight creped kraft paper which were impregnated with a 50 percent solution of standard alkaline catalyzed phenol-formaldehyde resin, the dried resin content of each such core layer being about 30 percent by weight. The laminate was prepared by successively superimposing two phenolic impregnated kraft paper sheets, one phenolic resin impregnated creped kraft paper sheet, thirteen phenolic resin impregnated kraft paper sheets, one 55 pound basis weight print sheet impregnated with the above melamine resin without internal lubricant and a melamine resin impregnated overlay paper as described above. The laminate so laid up was placed between polished stainless steel pans and cured for 15 to 18 minutes at 130 to 135° C. at 1500 psi, the laminate then being cooled still under pressure to below 40° C. and removed from the press. Actually, the laminating process is of a time-temperature-pressure nature and can be prepared by curing for from about 10 to 25 minutes at from about 130° C. to 150° C. at pressures ranging from about 1000 psi to about 1500 psi. The resulting laminate was 130 mils thick and was sanded on its back side to a 125 mil thickness. The finished laminate was cut to size and cemented using contact cement to an existing hardwood bowling lane. Joints between laminate sheets were filled with elastomeric material, specifically RTV silicone calk, other useful calks being those based on polyurethane and polysulfide materials.

EXAMPLE 2

Example 1 was repeated except that as a lubricity imparting material there was included in the 50 percent by weight water solution of melamine formaldehyde resin an emulsion of polyethylene, specifically Allied Chemical Company polyethylene 629, adjusted to 25 percent by weight solids using a non-ionic emulsifier to provide in the final cured overlay impregnating resin about 5.6 percent by weight polyethylene solids.

The slippage or lubricity of the above lane surfaces were measured using a modified lane analyzer made by DBA Products Co., Inc. Briefly, the modified lane analyzer consists basically of a weighted slide with three smooth metal feet resting on the lane surface which is propelled along a supported graduated scale by a calibrated coiled spring which is compressed and then released. The resistance to motion, or, conversely, the lubricity of the lane or surface contacted by the slide is measured on the graduated scale at the point where the friction between the slide and the lane surface overcomes the energy of the spring and the slide comes to rest. The modified lane analyzer when used to measure a lacquered surfaced and oil-treated wooden lane shows a reading of from about 120 to 130 for that portion of the lane which is oiled. A standard decorative laminate such as those described above but without the internal lubricant gives lane analyzer values in the range of from about 170 to 180, as do lacquered wooden lanes, and such lanes without internal lubricant but with fresh oil dressing give values of from between about 120 to 130 near the foul lane to about 160 near the pin deck or location of the pins. The following table shows the comparative values obtained under identical treatment with the modified lane analyzer of the laminate with varying amounts of silicone internal lubricant of Example 1 and the polyethylene internally lubricated surface of Example 2.

TABLE

| Example 1 | Range of Readings |
|---|---|
| 2% silicone solids | 138 – 143 |
| 4% silicone solids | 138 – 142 |
| 8% silicone solids | 118 – 131 |
| Example 2 | |
| 5.6% polyethylene solids | 150 |

There are provided, then, by the present invention bowling lane surfaces which in and of themselves without separate mineral oil or other external dressing or coating give characteristics comparable to those of a normal wooden lane with mineral oil dressing. The internally lubricated surfacing of the present invention can be used for the entire length of the bowling lane or for any portion of the lane desired. While certain proportions of lubricant are exemplified which approximate or match the effects separately applied or external dressings, the proportions can be varied to suit any desired conditions. Thus, a first portion of the lane surface at the ball delivery end can have a relatively high amount of internal lubricant, a second portion a relatively lesser amount of lateral lubricant and the last portion of the lane toward the pin deck no lubricant at all or any desired amount to impart the desired lubricity or slip. The transverse lane characteristics can even be varied as desired. The traditional control or slide, roll and hook of the ball normally desired by American bowlers can be achieved by the present invention or varied as desired by adjusting the internal lubricant content of the lane. The invention can also be utilized in other systems of lane bowling.

What we claim as new and desire to secure by Letters Patent of the United States is:

1. A decorative laminate for a bowling lane surface, said laminate comprising a fibrous resin-impregnated core, a resin-impregnated overlying fibrous print sheet and a fibrous, resin impregnated overlay, the resin in said overlay containing an effective amount of a lubricant material which imparts to said surface a desired lubricity or slip.

2. A decorative laminate as in claim 1 wherein said core is of paper.

3. A decorative laminate as in claim 1 wherein the lubricity approximates that of a lacquered and oiled wood surfaced bowling lane.

4. A decorative laminate as in claim 1 wherein the lubricity approximates that of an oiled decorative laminate without said material.

5. A decorative laminate as in claim 1 wherein said lubricity imparting material is a siloxane.

6. A decorative laminate as in claim 5 in which said lubricity imparting material comprises polydimethylsiloxane.

7. A decorative laminate as in claim 6 wherein said lubricity imparting material is from about 2 to about 8 percent by weight siloxane solids based on the weight of the cured overlay resin.

8. A decorative laminate as in claim 7 wherein said lubricity imparting material is about 2 percent by weight solids based on the weight of the cured overlay resin.

9. A decorative laminate as in claim 7 wherein said lubricity imparting material is about 4 percent by weight solids based on the weight of the cured overlay resin.

10. A decorative laminate as in claim 7 wherein said lubricity imparting material is about 8 percent by weight solids based on the weight of the cured overlay resin.

11. A decorative laminate as in claim 7 wherein said lubricity imparting material is about 5 percent by weight solids based on the weight of the cured overlay resin.

12. A decorative laminate as in claim 1 in which said lubricity imparting material comprises emulsifiable polyethylene.

13. A decorative laminate as in claim 10 wherein said lubricity imparting material is about 5.6 percent by weight of the cured overlay resin.

14. A decorative laminate as in claim 12 wherein said lubricity imparting material is added as an emulsion of emulsifiable polyethylene and water.

15. A decorative laminate as in claim 5 in which said lubricity imparting material is added as a 35 percent by weight emulsion of polydimethylsiloxane in water, said polydimethylsiloxane having a viscosity or 10,000 centipoises at 25° C.

16. A bowling lane having a decorative laminate comprising a resin surface, said surface containing an internal lubricant material, the amount of which is varied along the lane as desired.

17. The process of controlling the reaction to a delivered bowling ball of a bowling lane having a decorative laminate resin surface which comprises incorporating into said resin surface of said lane an effective amount of a lubricity imparting material.

18. The process of controlling the reaction to a delivered bowling ball of a decorative laminate surfaced bowling lane which comprises incorporating in the resin impregnant for the surface of the decorative laminate an effective amount of an emulsifiable lubricity imparting material.

19. A decorative laminate as in claim 1 in which said material is an emulsifiable lubricant.

* * * * *